(12) United States Patent
Sonobe

(10) Patent No.: US 10,683,685 B2
(45) Date of Patent: Jun. 16, 2020

(54) RECIPROCATING DEVICE

(71) Applicant: HI-LEX CORPORATION, Hyogo (JP)

(72) Inventor: Hiroshi Sonobe, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 198 days.

(21) Appl. No.: 15/548,226

(22) PCT Filed: Feb. 2, 2016

(86) PCT No.: PCT/JP2016/052993
§ 371 (c)(1),
(2) Date: Aug. 2, 2017

(87) PCT Pub. No.: WO2016/125768
PCT Pub. Date: Aug. 11, 2016

(65) Prior Publication Data
US 2018/0266151 A1    Sep. 20, 2018

(51) Int. Cl.
*E05B 83/34* (2014.01)
*B60K 15/05* (2006.01)
(Continued)

(52) U.S. Cl.
CPC .............. *E05B 83/34* (2013.01); *B60K 15/05* (2013.01); *E05B 81/28* (2013.01); *E05B 81/30* (2013.01);
(Continued)

(58) Field of Classification Search
CPC .......... E05B 83/34; E05B 81/28; E05B 81/30; E05B 81/36; E05B 81/06; E05B 81/14;
(Continued)

(56) References Cited

U.S. PATENT DOCUMENTS 9,038,499 B2 * 5/2015 Ishiguro ................. B60K 15/05
220/315
2006/0220412 A1   10/2006 Norton
(Continued)

FOREIGN PATENT DOCUMENTS

CN       203905943 U    10/2014
JP       2008-238895 A  10/2008
(Continued)

OTHER PUBLICATIONS

International Search Report from International Application No. PCT/JP2016/052993 dated Apr. 5, 2016.
(Continued)

*Primary Examiner* — Thomas C Diaz
(74) *Attorney, Agent, or Firm* — Brundidge & Stanger, P.C.

(57) ABSTRACT

A reciprocating device includes; a reciprocating component, a forward-backward position control mechanism that controls the reciprocating component in a forward-backward movement, and a restricting member that puts the reciprocating component in a restricted state in which the forward-backward movement is restricted. The reciprocating component is provided on the casing such that the reciprocating component moves forward or backward while rotating relative to the casing. The forward-backward position control mechanism includes; a casing-side member, and a reciprocating component-side member fitted with the reciprocating component such that the reciprocating component is rotatable relative to the reciprocating component-side member. The restricting member is movable between a restriction position where the reciprocating component is in the restricted state and a restriction-lift position where the
(Continued)

restricted state is cleared. The restricting member located at the restriction position engages with the reciprocating component-side member to put the reciprocating component in the restricted state.

2 Claims, 12 Drawing Sheets

(51) Int. Cl.
*E05C 19/02* (2006.01)
*E05B 81/36* (2014.01)
*E05B 81/28* (2014.01)
*E05B 81/30* (2014.01)
*E05B 81/14* (2014.01)
*E05B 81/06* (2014.01)

(52) U.S. Cl.
CPC ............ *E05B 81/36* (2013.01); *E05C 19/022* (2013.01); *B60K 2015/053* (2013.01); *B60K 2015/0538* (2013.01); *B60K 2015/0576* (2013.01); *B60K 2015/0584* (2013.01); *E05B 81/06* (2013.01); *E05B 81/14* (2013.01)

(58) Field of Classification Search
CPC .............. B60K 15/05; B60K 2015/053; B60K 2015/0538; B60K 2015/0576; B60K 2015/0584; E05C 19/022

See application file for complete search history.

(56) References Cited

U.S. PATENT DOCUMENTS

| | | |
|---|---|---|
| 2014/0251036 A1 | 9/2014 | Ishiguro |
| 2014/0291996 A1 | 10/2014 | Basavarajappa et al. |
| 2014/0319846 A1 | 10/2014 | Basavarajappa et al. |
| 2017/0043660 A1* | 2/2017 | Horikawa .............. B60K 15/05 |

FOREIGN PATENT DOCUMENTS

| | | |
|---|---|---|
| JP | 2011-80301 A | 4/2011 |
| JP | 2014-120231 A | 6/2014 |
| JP | 2014-173422 A | 9/2014 |
| JP | 2015-209689 A | 11/2015 |
| KR | 101247386 B1 | 3/2013 |

OTHER PUBLICATIONS

First Examination Report for Indian Patent Application No. 201727027306 dated Sep. 25, 2019, 7 pages.

* cited by examiner

RECIPROCATING DEVICE

TECHNICAL FIELD

The present invention relates to a reciprocating device including a casing and a reciprocating component that can move forward and backward relative to the casing.

BACKGROUND ART

Fuel lids shield fuel filler ports on automobiles and other vehicles. The fuel lids are generally attached to vehicle bodies via hinges. Patent Literature 1 discloses an opening and closing apparatus that opens or closes a fuel lid through the forward-backward movement of a shaft-shaped push rod along the axis of the rod. The push rod moves forward or backward between a depression position for closing the fuel lid and a projection position for opening the fuel lid, and rotate in the direction of rotation centered the axis of the push rod while moving forward or backward. The push rod has a latching segment at a front end, whereas the fuel lid has a latching-object segment at a section corresponding to the latching segment. While the push rod is at the depression position, the latching segment engages with the latching-object segment of the fuel lid. While the push rod is in a process of moving toward the projection position, the push rod and the latching segment rotate so as to disengage the latching segment from the latching-object segment of the fuel lid.

The opening and closing apparatus of Patent Literature 1 includes a locking mechanism (FIGS. 11 and 12) for locking the forward-backward movement of the push rod. The locking mechanism gets a locking member to engage with the push rod by a motor. This configuration prevents the push rod from moving forward and backward. The locking by the locking mechanism prevents the push rod from moving forward and backward, and the fuel lid from opening even if the fuel lid is operated.

CITATION LIST

Patent Literature

Patent Literature 1: JP 2014-173422 A

SUMMARY OF INVENTION

Technical Problem

However, the conventional locking mechanism for the push rod described above performs locking by getting the locking member to engage with a protrusion on the push rod. The protrusion of the push rod rotates and moves together with the push rod. Thus, if the dimensional accuracy of the push rod or the locking member is low, or if the push rod or the locking member is worn due to age deterioration, the locking member has difficulty in engaging properly with the protrusion of the push rod and restricting the forward-backward movement of the push rod.

The disadvantage as described above can be similarly suffered by any reciprocating device that lets a reciprocating component simultaneously rotate and move forward or backward, such as a device that lets a push rod simultaneously rotate and move forward or backward, other than the fuel lid opening and closing apparatus.

It is an object of the present invention to enable a reciprocating device that has a reciprocating component to move forward and backward to readily restrict a forward-backward movement of the reciprocating component.

Solution to Problem

A reciprocating device according to an aspect of the present invention includes; a casing, a reciprocating component that can move forward and backward relative to the casing, a forward-backward position control mechanism that controls the reciprocating component in moving forward to a forward position from the casing and moving backward to a backward position into the casing, and a restricting member that puts the reciprocating component in a restricted state in which a forward-backward movement of the reciprocating component is restricted. The reciprocating component is provided on the casing such that the reciprocating component moves forward or backward while rotating relative to the casing. The forward-backward position control mechanism includes; a casing-side member provided on a predetermined site of the casing, and a reciprocating component-side member provided on the reciprocating component such that the reciprocating component-side member fit rotatably relative to the reciprocating component. The restricting member is provided movably between a restriction position where the reciprocating component is put in the restricted state and a restriction-lift position where the restricted state is cleared. In the restriction position, the reciprocating component is put in the restricted state by engaging with the reciprocating component-side member.

Advantageous Effects of Invention

A device according the present invention can readily restrict a forward-backward movement of a reciprocating component.

DESCRIPTION OF EMBODIMENTS

Each embodiment of the present invention will now be described in detail with reference to the attached drawings.

Figure 1:
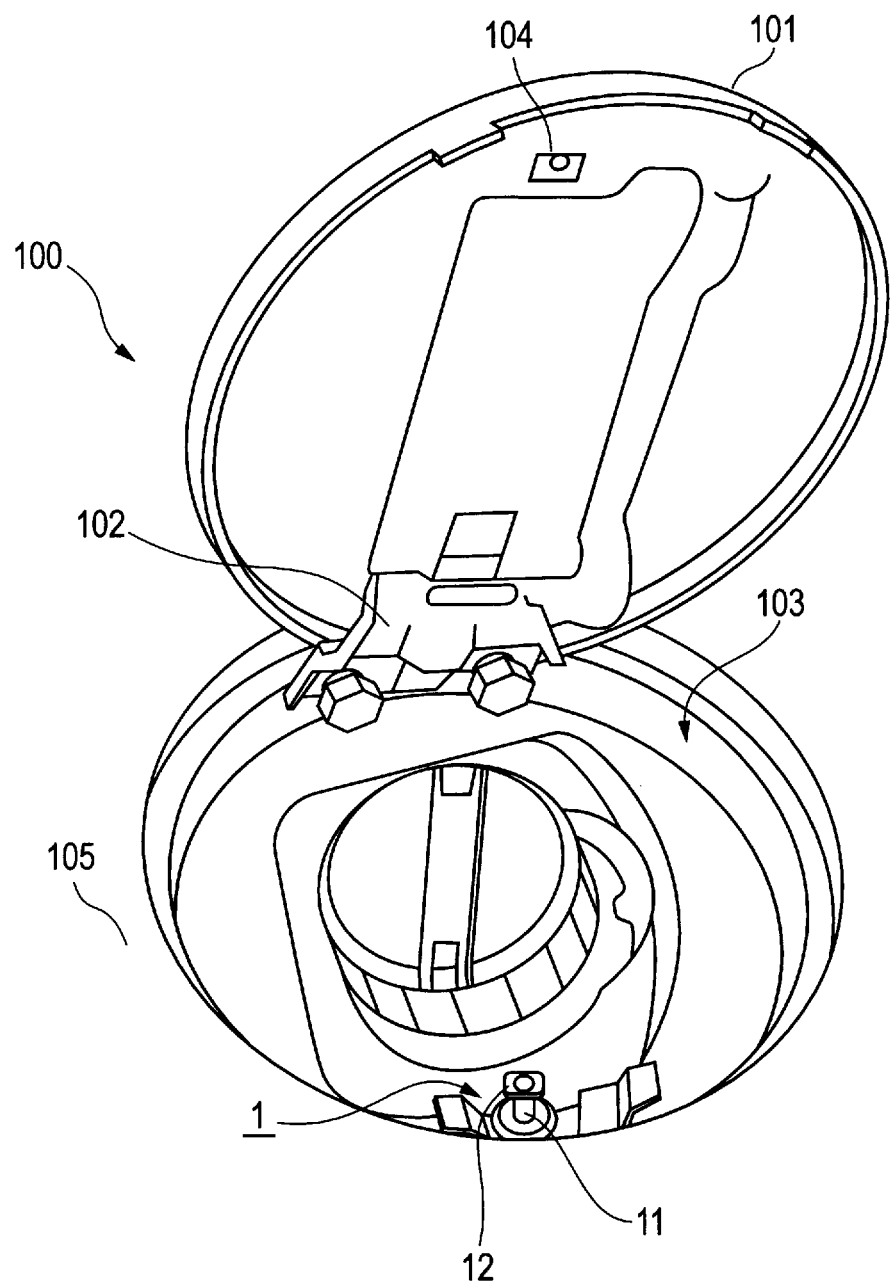
FIG. 1 is a perspective view of a fuel lid opening and closing apparatus to which a reciprocating device according to an embodiment of the present invention is applied.
Figure 2:
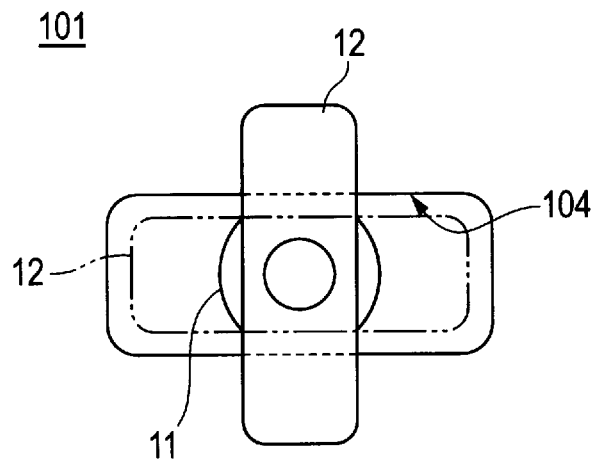
FIG. 2 is a drawing that illustrates a relationship between a latching segment of a reciprocating component and a latching-object segment of a fuel lid.

FIG. 1 is a perspective view of a fuel lid opening and closing apparatus to which a reciprocating device according to an embodiment of the present invention is applied. FIG. 2 is a drawing that illustrates a relationship between a latching segment of a reciprocating component and a latching-object segment of a fuel lid.

An opening and closing apparatus 100 according to the present embodiment is an apparatus designed to open and close a lid for a hole through which a filler port on a vehicle is accommodated. The opening and closing apparatus 100 includes a hole 103 provided on a vehicle body 105, a fuel lid 101 for covering the hole 103, a hinge 102 that supports the fuel lid 101 rotatably, and a reciprocating device 1.

The reciprocating device 1 includes a reciprocating component 11 and a latching segment 12 provided on an end of the reciprocating component 11. The reciprocating component 11 moves forward or backward to open or close the fuel lid 101.

The fuel lid 101 has a latching-object segment 104 that is designed to be engageable with the latching segment 12 of the reciprocating component 11.

The opening and closing apparatus 100 configured as described above gets the fuel lid 101 to be closed by letting the fuel lid 101 press the reciprocating component 11 such that the reciprocating component 11 moves inward to the vehicle 105. The latching segment 12 of the reciprocating component 11 rotates and engages with the latching-object segment 104. In FIG. 2, the latching segment 12 shown in virtual lines is in contact with the latching-object segment 104, whereas the latching segment 12 shown in solid lines is in engagement with the latching-object segment 104. The latching-object segment 104 forms a hole that allows the passage of the latching segment 12, for example. When the latching segment 12 has passed through the hole of the latching-object segment 104 and rotated, the latching segment 12 engages with the latching-object segment 104 such that the latching segment 12 is prevented from passing through the hole of the latching-object segment 104. This configuration gets the fuel lid 101 to be closed and locked.

Pressing the fuel lid 101 while the hole 103 is covered with the fuel lid 101 causes spring force to act on the reciprocating component 11 such that the reciprocating component 11 moves outward from the vehicle 105. At this time, the latching segment 12 of the reciprocating component 11 rotates and gets disengaged from the latching-object segment 104. This configuration constitutes an opening operation of the fuel lid 101.

If the reciprocating device 1 is in a restricted state in which a forward-backward movement of the reciprocating device 1 is restricted, pressing the fuel lid 101 again while the fuel lid 101 is closed does not cause the reciprocating component 11 to move forward nor backward such that the fuel lid 101 remains closed.

The reciprocating device 1 will now be described in detail.

Figure 3:
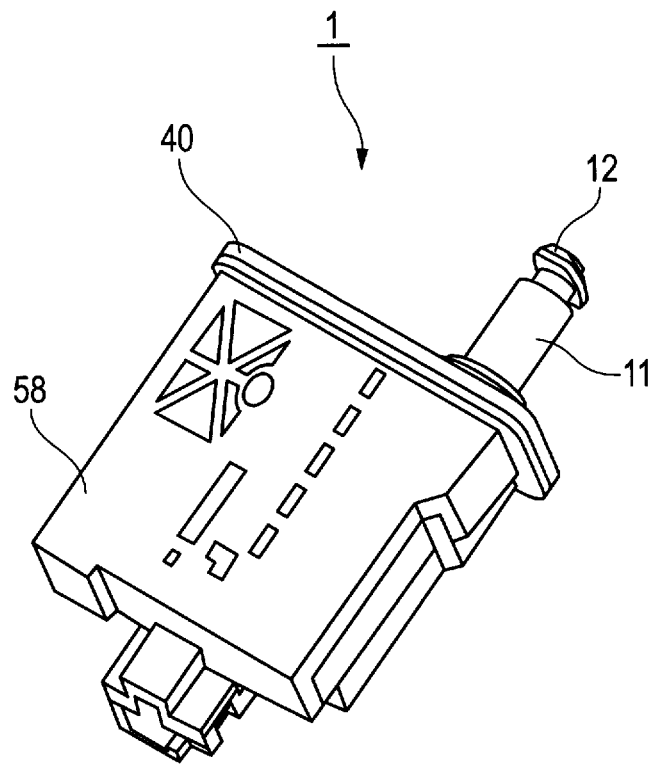
FIG. 3 is a perspective view of the reciprocating device according to an embodiment of the present invention.
Figure 4:
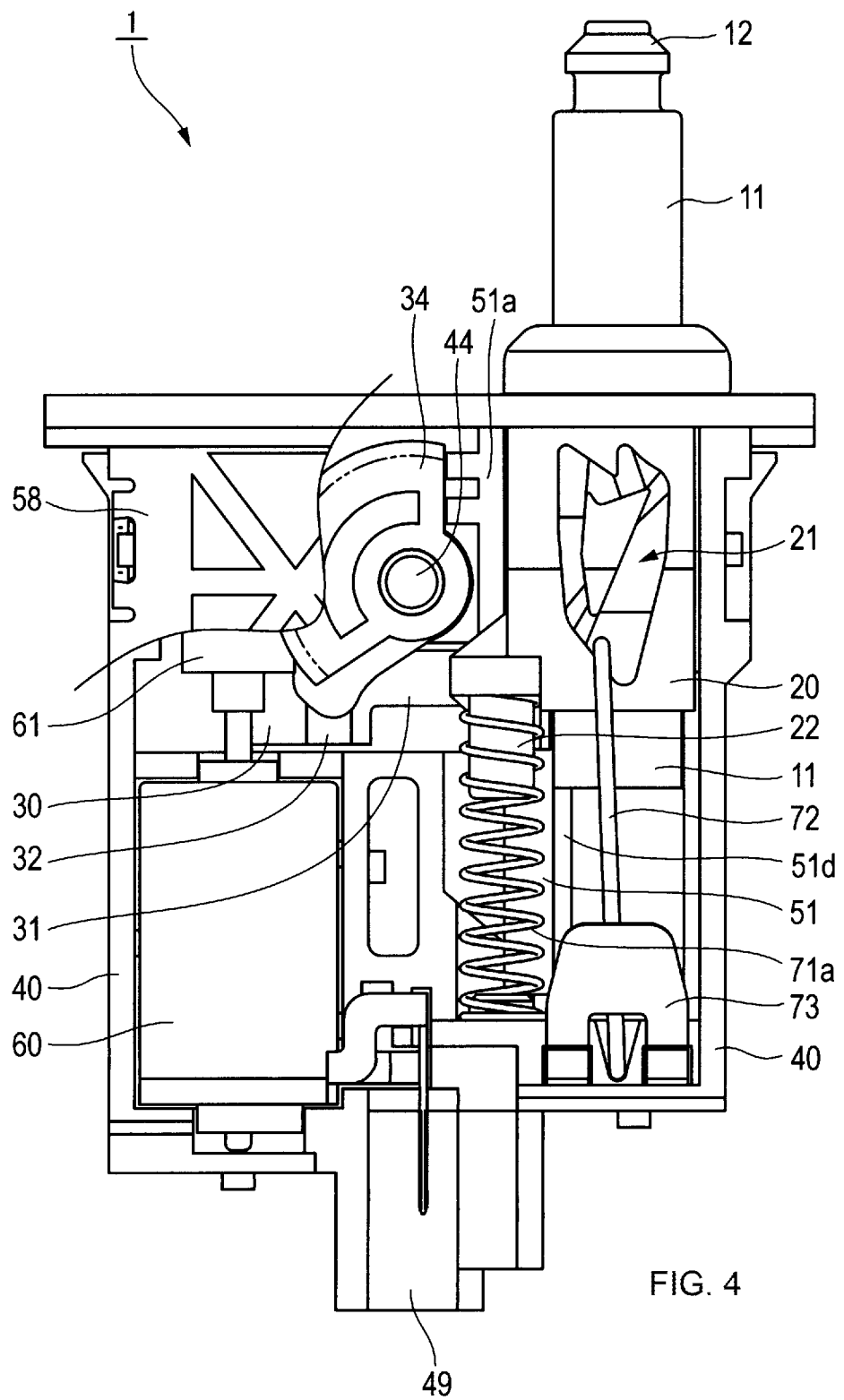
FIG. 4 is an elevation view of the reciprocating device in which the reciprocating component is located at a forward position after a forward movement according to an embodiment of the present invention.
Figure 5:
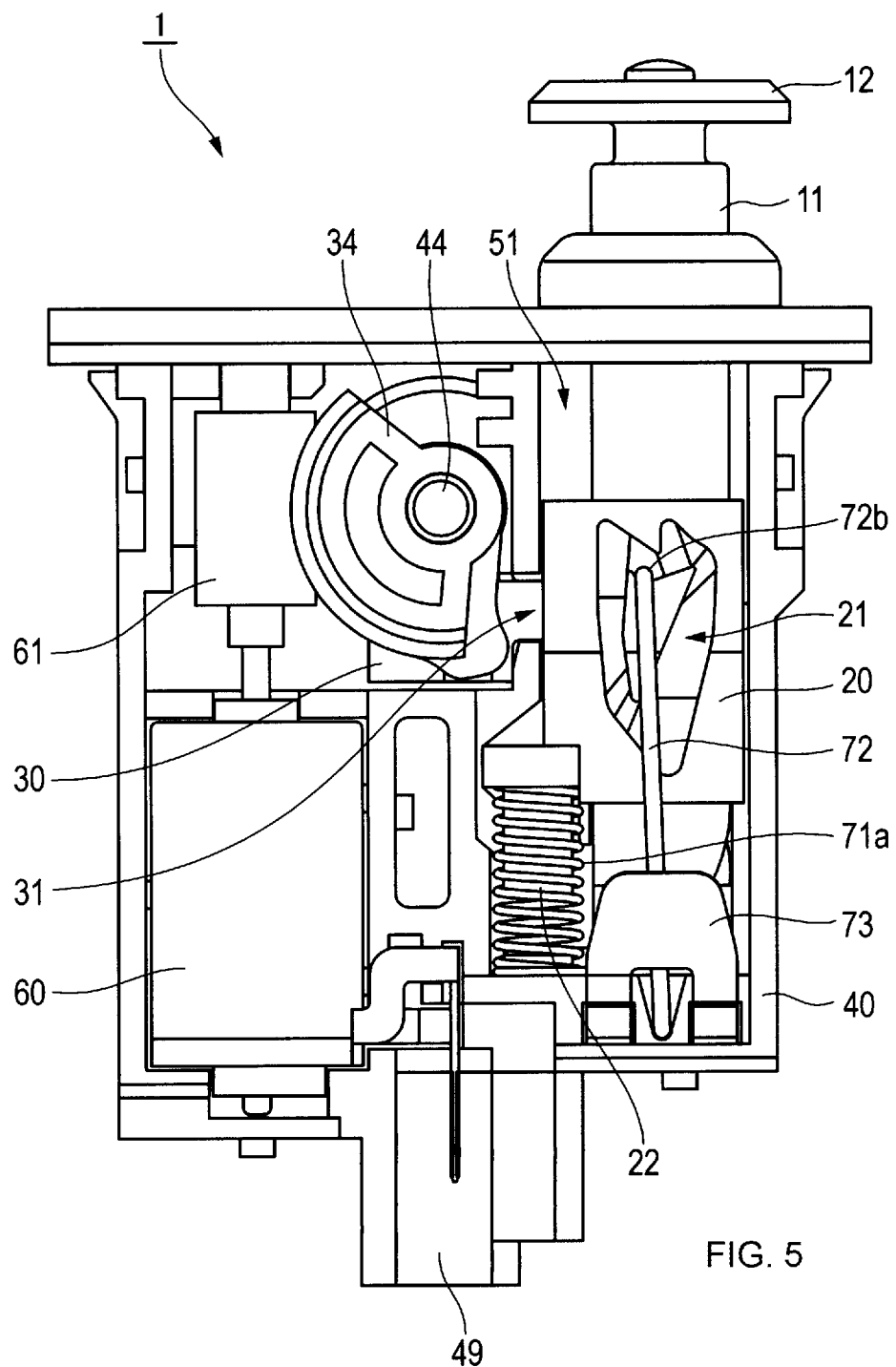
FIG. 5 is an elevation view of the reciprocating device in which the reciprocating component is located at a backward position after a backward movement according to an embodiment of the present invention.

FIG. 3 is a perspective view of the reciprocating device 1 according to an embodiment of the present invention. FIG. 4 is an elevation view of the reciprocating device 1 in which the reciprocating component is located at an forward position after a forward movement. FIG. 5 is an elevation view of the reciprocating device 1 in which the reciprocating component is located at a backward position after a backward movement. FIGS. 6, 7 and 9 to 12 are each a perspective view of the reciprocating device 1 divided into a plurality of components. FIG. 8 is a rear perspective view of a reciprocating component-side member. FIG. 13(a) is an elevation view of the reciprocating component-side member. FIG. 13(b) is a cross-sectional view taken from line B-B of FIG. 13(a). FIG. 13(c) is a bottom view of the reciprocating component-side member. FIG. 13(d) is a cross-sectional view taken from line A-A of FIG. 13(a). FIG. 14(a) is an elevation view of a casing in FIG. 6. FIG. 14(b) is a cross-sectional view taken from line K-K of FIG. 14(a).

The reciprocating device 1 includes the reciprocating component 11, a casing 40, a reciprocating component-side member 20, a restricting member 30, a worm wheel 34, a motor 60, a worm 61, a spring 71, a pin 72, a leaf spring 73, and a cover 58.

Figure 6:
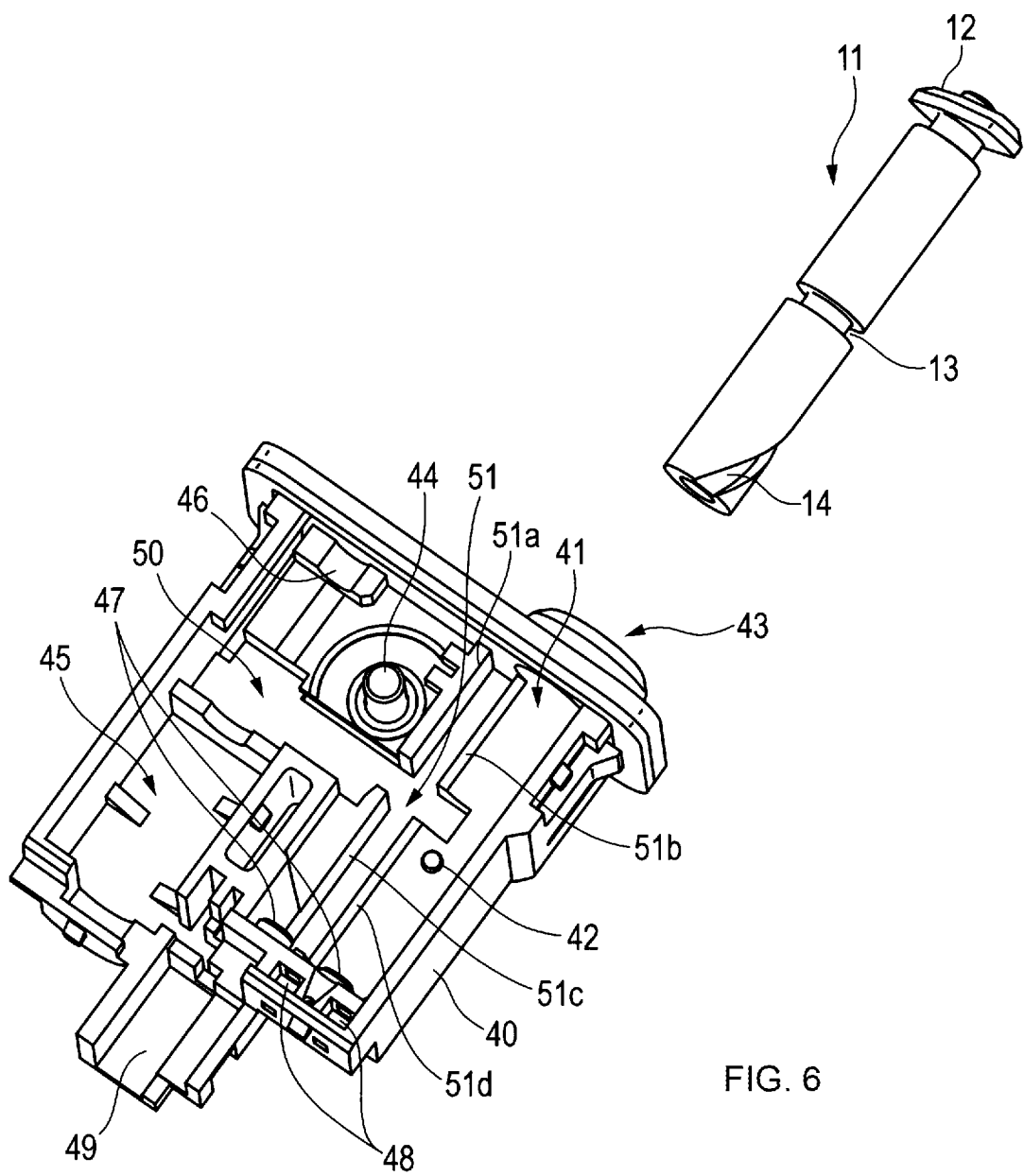
FIG. 6 is a perspective view of the reciprocating device divided into the reciprocating component and a casing according to an embodiment of the present invention.
Figure 14:
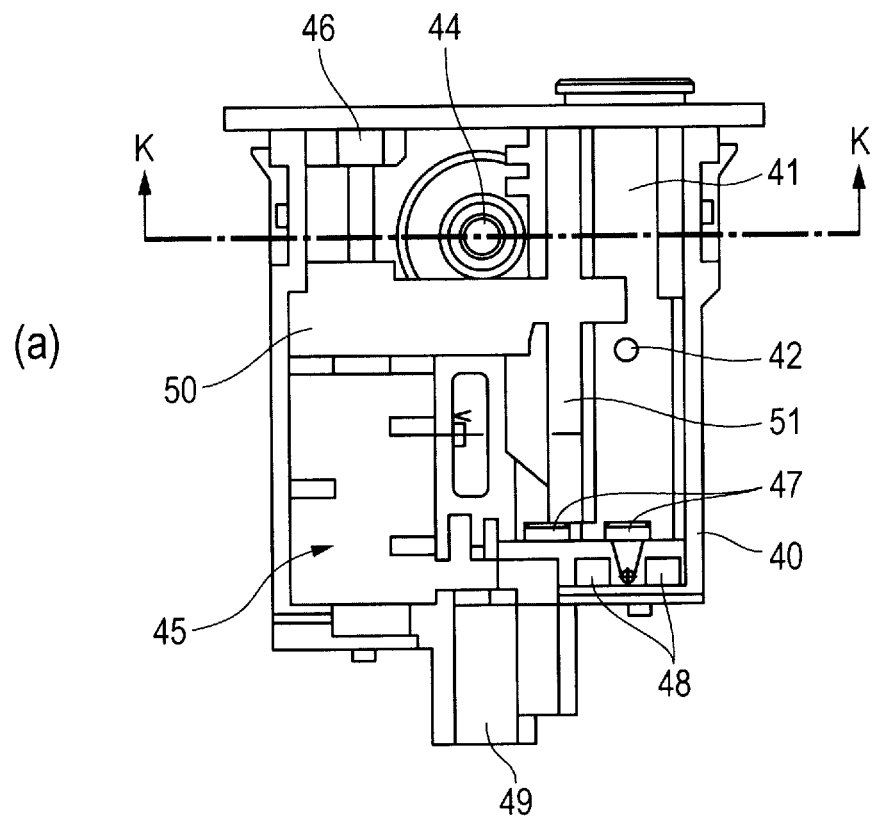
FIG. 14(a) is an elevation view of the casing in FIG. 6.
FIG. 14(b) is a cross-sectional view taken from line K-K of FIG. 14(a).
Figure 14:
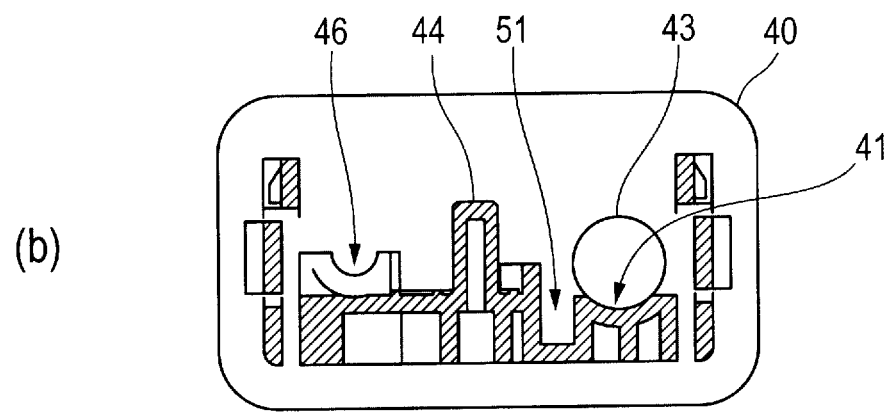

With reference to FIGS. 6 and 14, the casing 40 has a plurality of holders for holding respective components. The casing 40 has an opening, and the cover 58 is put on the opening such that the casing 40 accommodates the plurality of components inside. One surface of the casing 40 is provided with a through-hole 43 that allows a part of the reciprocating component 11 to pass through and thus enables the reciprocating component 11 to move outward from the casing 40 or move inward to the casing 40. The casing 40 includes the opening at a top thereof, a bottom segment, and wall segments that stand on the bottom segment, and thereby forms the holders for holding the plurality of components such as the reciprocating component 11 and the restricting member 30.

The casing 40 provides a first holder 41 that holds the reciprocating component 11 movably in one direction, a third holder 50 that holds the restricting member 30 slidably, a second holder 51 that holds a part of the reciprocating component-side member 20 slidably, a shaft 44 that supports the worm wheel 34 rotatably, a bearing 46 that supports a shank 61a of the worm 61, a motor holder 45 that holds the motor 60, spring holding shafts 47, and a leaf spring holder 48.

The reciprocating component 11 includes a cylindrical or round tubular rod and the latching segment 12 provided on an end of the rod. The rod includes an annular groove 13 that extends partially along an axis of the rod and a helical groove 14 provided at the backward-side of the annular groove 13. The annular groove 13 is a fitting-object section that the reciprocating component-side member 20 (described later) rotatably fit with the fitting-object section relative to the rod. A direction of an axis of the reciprocating component 11 is equivalent to a direction of forward-backward movement of the reciprocating component 11. In this specification, the forward direction is a direction in which the reciprocating component 11 moves outward from the casing 40, whereas the backward direction is a direction in which the reciprocating component 11 moves inward to the casing 40. The fitting-object section is provided such that displacement of the reciprocating component-side member 20 at the time of rotating of the reciprocating component 11 on the rod axis does not impede restriction put by the restricting member 30. The annular groove 13 is perpendicular to the axis of the reciprocating component 11.

The reciprocating component 11 is passed through the through-hole 43 of the casing 40 and is slidably held on to the first holder 41 of the casing 40. The first holder 41 has a wall surface for holding the reciprocating component. The wall surface is provided with a protrusion 42. The reciprocating component 11 is disposed such that the protrusion 42 on the wall surface located at the bottom segment of the casing 40 (opposite to the side where the cover is installed) is inserted into the helical groove 14. Wall surfaces of the reciprocating component-side member 20 (described later), the cover 58, and the wall surface of the casing 40 restrict movements of the reciprocating component 11 in directions perpendicular to the axis direction, and thus the protrusion 42 is prevented from being detached from the helical groove 14. Since the protrusion 42 restricts the position of the reciprocating component 11 in a circumferential direction of the helical groove 14, a forward-backward movement of the reciprocating component 11 causes the reciprocating component 11 to rotate on the axis. The helical groove 14 can be configured as a widely-known groove if the reciprocating component 11 is rotatable to open or close the fuel lid.

The protrusion 42 of the first holder 41 and the helical groove 14 of the reciprocating component 11 constitute a route guide and a route-receiving guide. The route guide guides the reciprocating component 11 along a route for rotational movement of the reciprocating component 11. The first holder 41 may be provided with a route guide such as a helical groove, and the reciprocating component 11 may be provided with a route-receiving guide such as a protrusion.

Figure 7:
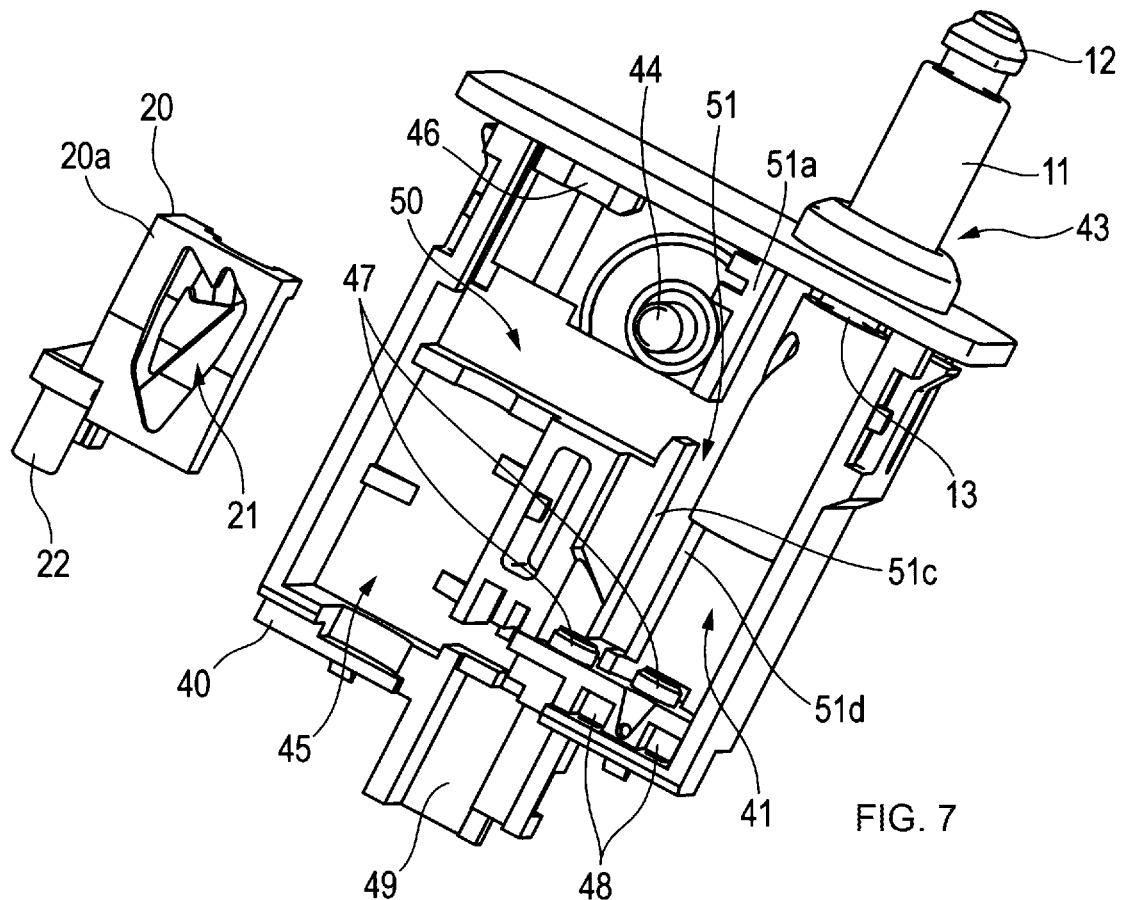
FIG. 7 is a perspective view of the reciprocating device divided into a main unit and a reciprocating component-side member according to an embodiment of the present invention.
Figure 8:
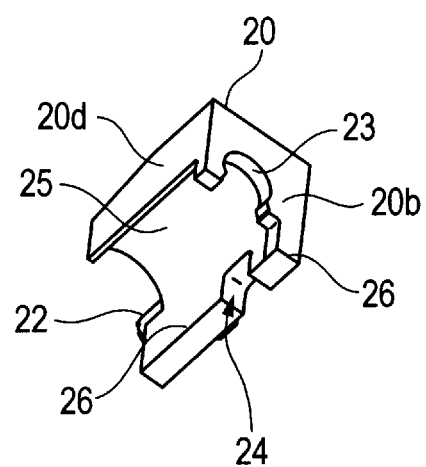
FIG. 8 is a rear perspective view of the reciprocating component-side member.

With reference to FIGS. 7 and 8, the reciprocating component-side member 20 is rotatably fitted relative to the reciprocating component 11 such that the component is relative to the member. Specifically, the reciprocating component-side member 20 includes a second plate segment 20b that extends perpendicular to the axis of the reciprocating component 11 from a first plate segment 20a. A first plate segment 20a includes a guide 21 such that the reciprocating component-side member 20 extends parallel to the axis of the reciprocating component 11. The second plate segment 20b has a C-shaped fitting section 23 that fits with the annular groove 13 of the reciprocating component 11. Thus, the second plate segment 20b slides along the annular groove 13, i.e. a fitting-object section, in a direction perpendicular to the axis of the reciprocating component 11. The annular groove 13, i.e. the fitting-object section, locks movement of the second plate segment 20b in a direction parallel to the axis of the reciprocating component 11. This configuration allows the reciprocating component 11 and the reciprocating component-side member 20 to rotate relatively on the axis of the reciprocating component 11, and prevents the reciprocating component 11 and the reciprocating component-side member 20 from moving relatively to the axis of the reciprocating component 11. The reciprocating component-side member 20 further includes a third plate segment 20c provided so as to intersect at right angles to the first and second plate segments 20a and 20b, and a fourth plate segment 20d provided so as to face the third plate segment 20c and intersect at right angles to the first and second plate segments 20a and 20b. When the fitting section 23 is fitted with the annular groove 13, the reciprocating component-side member 20 is mounted on the reciprocating component 11 such that the reciprocating component 11 is circumferentially surrounded by the first, third, and fourth plate segments 20a, 20c, and 20d. The reciprocating component-side member 20 has a curved surface 25 contoured to the shape of an outer surface of the rod of the reciprocating component 11. With the curved surface 25 sliding along the outer surface of the rod of the reciprocating component 11, the reciprocating component-side member 20 and the reciprocating component 11 rotate relatively. This configuration provides rotating without backlash. The fitting section 23 is disposed on the forward side of the reciprocating component-side member 20 in the forward-backward direction of the reciprocating component 11.

The structure in which the reciprocating component-side member 20 is fitted with the reciprocating component 11 may be any structure that allows the two components to rotate relatively to each other on the axis of the reciprocating component 11. The reciprocating component 11 may be provided with an annular protrusion, and the reciprocating component-side member 20 may be provided with an annular groove that the annular protrusion fits into, for example. The annular protrusion may be replaced with a plurality of protrusions. The fitting section of the reciprocating component-side member 20 and the fitting-object section of the reciprocating component 11 move with the forward-backward movement to the axis of the reciprocating component 11. In case of movement restriction of reciprocating component-side member 20, the fitting section 23 of the reciprocating component-side member 20 and the fitting-object section of the reciprocating component 11 are fitted so that the reciprocating component 11 rotates relative to the reciprocating component-side member 20 while restricting movement of reciprocating component 11. The specific shape is specifically not limited in the case of this fit. One of the sections should preferably be annular for the ease of installation.

The reciprocating component-side member 20 includes a shaft 22 that holds one end of a first spring 71a. The shaft 22 is provided on the backward side of the reciprocating component-side member 20 in the forward-backward direction of the reciprocating component 11. A central axis of the shaft 22 is substantially parallel to a central axis of the reciprocating component 11 and is distantly disposed from the central axis of the reciprocating component 11. Installation of the first spring 71a with respect to the reciprocating component 11 is not particularly limited, as long as the reciprocating component-side member 20 is energized by the spring. The spring may be installed coaxially with the reciprocating component 11. Preferably, the first spring 71a should be distantly disposed from the central axis of the reciprocating component 11 because this disposition allows a reduction in spring travel amount and thus a reduction in device size.

As shown in FIGS. 13(b), 13(c), and 13(d) as well, the reciprocating component-side member 20 includes a projection 26 that partially projects. The reciprocating component-side member 20 is held by the casing 40 such that the projection 26 is slidable on the second holder 51 of the casing 40. The second holder 51 has a linear shape and extends parallel to the forward-backward direction of the reciprocating component 11. In response to a forward or backward movement of the reciprocating component 11, the projection 26 moves along the second holder 51. Since the second holder 51 is laterally surrounded by walls 51*a* to 51*d*, the second holder 51 may prevent the reciprocating component-side member 11 from rotating. The projection 26 is provided on an end of the third plate segment 20*c* in a direction extending from the first plate segment 20*a*. The disposition of the projection 26 and points at which the projection 26 comes into contact with the casing 40 are not particularly limited as long as an attitude of the reciprocating component-side member 20 is stable during the forward-backward movement of the reciprocating component 11. The fourth plate segment 20*d* of the reciprocating component-side member 20 may slide on an inner wall of the casing so as to stabilize the attitude of the reciprocating component-side member 20 moving in line with the forward or backward movement of the reciprocating component 11.

The projection 26 has an engagement section that is configured to engage with the restricting member 30 to prevent the reciprocating component-side member from moving along the central axis of the reciprocating component 11. The engagement section forms a part of the projection 26 and serves as a hollow 24 that a prominence 31 of the restricting member 30 goes into.

The first plate segment 20*a* of the reciprocating component-side member 20 includes the guide 21 that is a plate-shaped part having asperities on its surface. The guide 21 will be described later.

Figure 9:
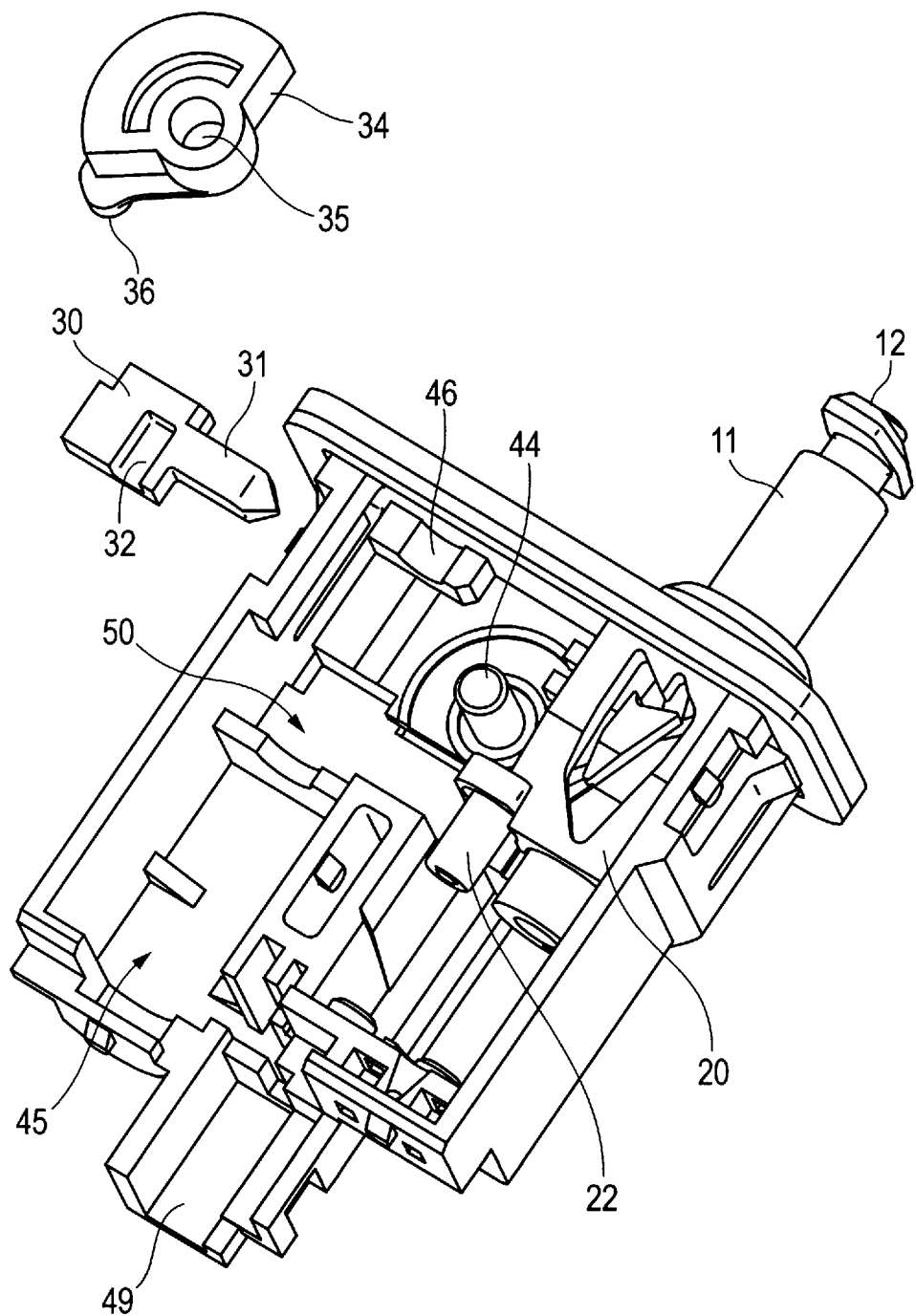
FIG. 9 is a perspective view of the reciprocating device divided into the main unit, a restricting member, and a gear according to an embodiment of the present invention.

With reference to FIG. 9, the restricting member 30 includes the prominence 31 extending from the main body in a direction that intersects the forward-backward direction of the reciprocating component 11 and an indentation 32 for converting a rotational movement into a rectilinear movement. The restricting member 30 is slidably held on the third holder 50 of the casing 40. The third holder 50 linearly extends in a direction identical to the direction of extension of the prominence 31 and enables the restricting member 30 to slide in this direction.

The worm wheel 34 is rotatably supported on the shaft 44 of the casing 40. The shaft 44 is rotatably passed through a shaft hole 35 of the worm wheel 34. The worm wheel 34 has a protrusion 36 that is slidably inserted into the indentation 32 of the restricting member 30. The protrusion 36 that moves along an arc in line with rotation of the worm wheel 34 slides on the indentation 32 and thereby transfers motive power to the restricting member 30. This motive power causes the restricting member 30 to slide along the third holder 50.

The reciprocating component 11 located at the backward position and the restricting member 30 that has moved a predetermined distance or greater cause the prominence 31 of the restricting member 30 to go into and engage with the hollow 24 of the reciprocating component-side member 20. This configuration put the reciprocating component 11 in a restricted state in which the forward-backward movement of the reciprocating component 11 is restricted (refer to FIG. 3). A front end of the prominence 31 is tapered in a direction that facilitates insertion into the hollow 24.

The position of the restricting member 30 in FIG. 5 is a restriction position where the reciprocating component 11 is put in the restricted state. The position of the restricting member 30 in FIG. 4 is a restriction-lift position where the restriction on the reciprocating component 11 is lifted. While the restricting member 30 is at the restriction-lift position (FIG. 4), the reciprocating component 11 is allowed to move forward and backward.

The structure that the reciprocating component 11 is put in the restricted state may be applied to any of various engagement structures. This structure is not only the structure that the prominence 31 of the restricting member 30 to go into the hollow 24 of the reciprocating component-side member 20. For example, the reciprocating component 11 may be put in the restricted state by a convex section on the reciprocating component 11 and a concave section on the restricting member 30, wherein the convex section engages with the concave section while the restricting member 30 is at the restriction position.

Figure 10:
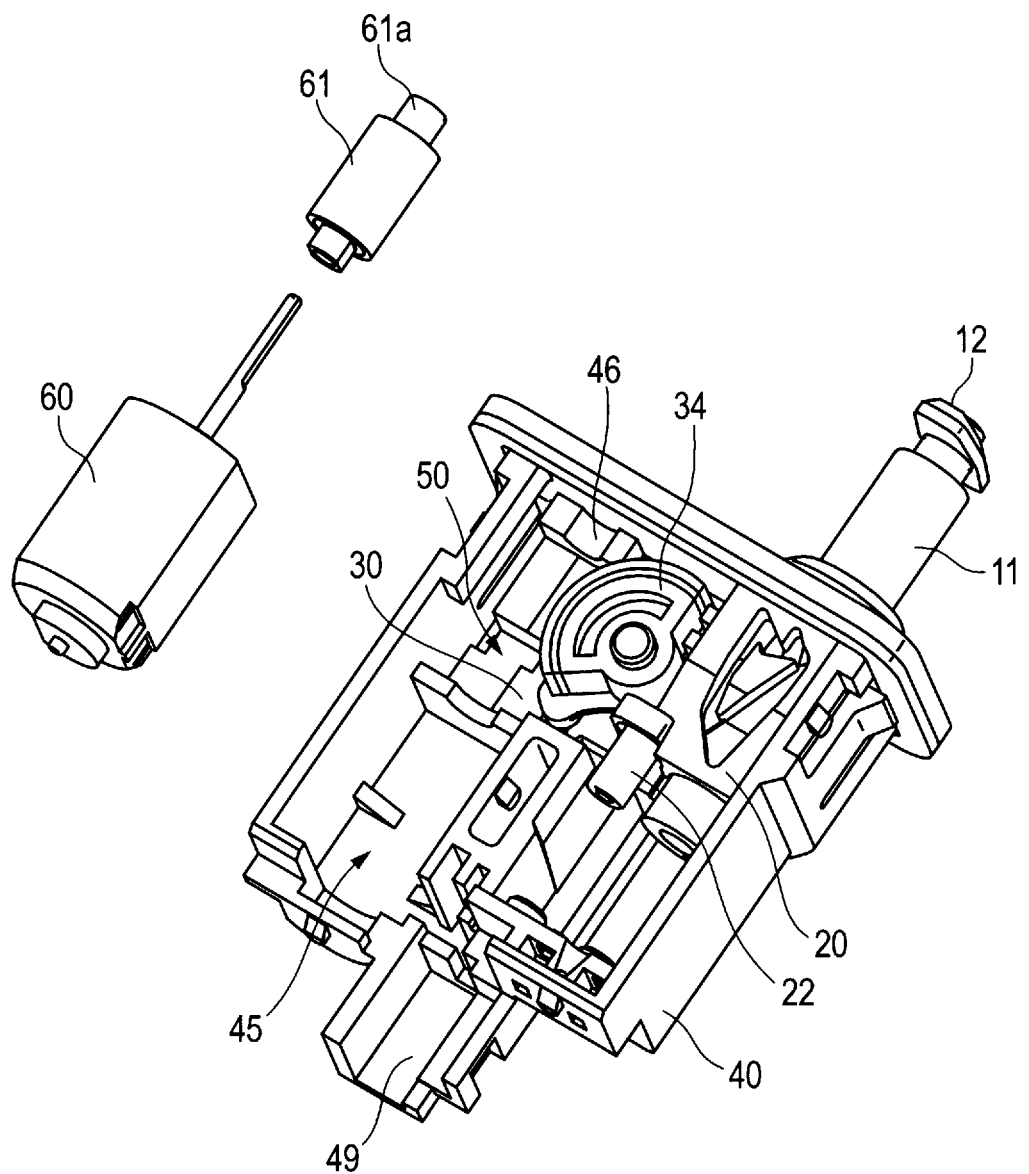
FIG. 10 is a perspective view of the reciprocating device divided into the main unit, a motor, and a worm according to an embodiment of the present invention.

With reference to FIG. 10, the worm 61 is fixed to the motor 60 such that the motor 60 drives the worm 61 to rotate. The motor 60 is held on the motor holder 45. The shank 61*a* of the worm 61 is supported on the bearing 46 of the casing 40. The worm 61 engages with the worm wheel 34 by gear. Wiring of the motor 60 that is led to the outside through an insertion hole 49 enclosed by the casing 40 and the cover 58.

Figure 11:
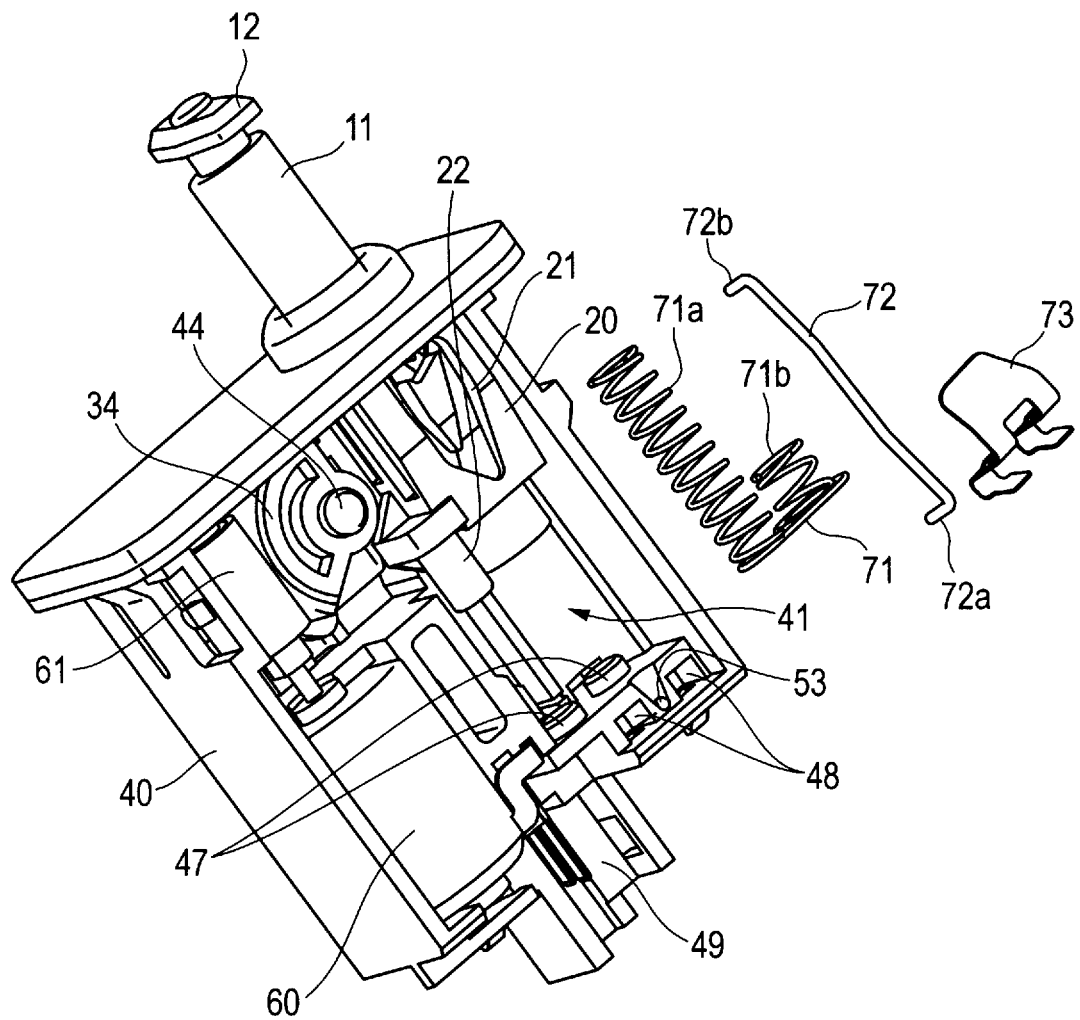
FIG. 11 is a perspective view of the reciprocating device divided into the main unit, a spring, a casing-side member, and a leaf spring according to an embodiment of the present invention.

With reference to FIG. 11, the spring 71 is made up of a first spring 71*a* and a second spring 71*b* that are aligned substantially parallel to each other. The first spring 71*a* is longer than the second spring 71*b* in length. The two springs may be integrated with each other. One end of the first spring 71*a* is held on one of the spring holding shafts 47 of the casing 40, and the other end of the spring is held on the shaft 22 of the reciprocating component-side member 20. This configuration causes the first spring 71*a* to apply repulsive force to the reciprocating component-side member 20 along the axis of the reciprocating component 11.

One end of the second spring 71*b* is held on the other spring holding shaft 47 that is provided on the backward position side of the casing 40 coaxially with the reciprocating component 11. A backward movement of the reciprocating component 11 causes the second spring 71*b* to come into contact with an opposite end to the latching segment 12 of the reciprocating component 11 and apply repulsive force to the reciprocating component 11 in the forward-backward direction. This configuration allows the reciprocating component 11 to be pressed. The repulsive force increases with a decrease in the interval between the reciprocating component 11 and a backward end.

The pin 72 includes a bend 72*a* that is provided at one end to fit with a fitting hole 53 (FIG. 11) of the casing 40 and a bend 72*b* that is provided at the other end to act as a guided section guided by the guide 21 of the reciprocating component-side member 20. As long as the pin 72 has stiffness that the forward-backward movement of the reciprocating component 11 is controllable, the pin 72 may have elasticity. The leaf spring 73 is fixed to the leaf spring holder 48 of the casing 40 such that the pin 72 is pressed against the guide 21. This configuration causes the end bend 72*b* of the pin 72 to be pressed against the guide 21 of the reciprocating component-side member 20 and thus fixes the pin 72 such that the pin 72 is rotatable about the fitting hole 53 of the casing 40.

A forward-backward position control mechanism that includes the guide 21 of the reciprocating component-side member 20 and the bend 72*b* of the pin 72 controls the forward-backward movement of the reciprocating component 11. The pin 72 is equivalent to an example casing-side member included in the forward-backward position control mechanism.

The guide 21 of the reciprocating component-side member 20 has a concave circuit on a plate-shaped surface and guides the bend 72*b* of the pin 72 along the concave circuit. A step is provided on a bottom of the concave circuit. The bend 72b of the pin 72 is guided such that the bend goes down the step. This configuration causes the bend 72b of the pin 72 to go around the concave circuit of the guide 21 in one direction. When the bend 72b of the pin 72 is located at a backward-side place (equivalent to an example of first place) on the concave circuit of the guide 21, the reciprocating component 11 is located at the forward position after the component has moved outward from the casing 40. When the bend 72b of the pin 72 is located at a forward-side place (equivalent to an example of second place) on the concave circuit of the guide 21, the reciprocating component 11 is located at the backward position after the component has moved inward into the casing 40.

The concave circuit of the guide 21 includes an M-shaped bend path provided at a forward side in the forward-backward direction of the reciprocating component 11. While the bend 72b of the pin 72 is guided along the M-shaped bend path, the reciprocating component 11 moves backward virtually to an end, then moves forward a bit and temporarily stops (the bend 72b of the pin 72 located at a valley of the M-shaped bend), and again moves backward virtually to an end before moving forward to the forward position.

The reciprocating component 11 moves backward by an external force and moves forward by the energizing force of the spring 71.

The forward-backward movement of the reciprocating component 11 may be controlled by any forward-backward position control mechanism other than the configuration described above. The casing 40 may have a fixed guide 21, and the reciprocating component 11 may be provided with a guided section guided by the guide 21, for example.

Figure 12:
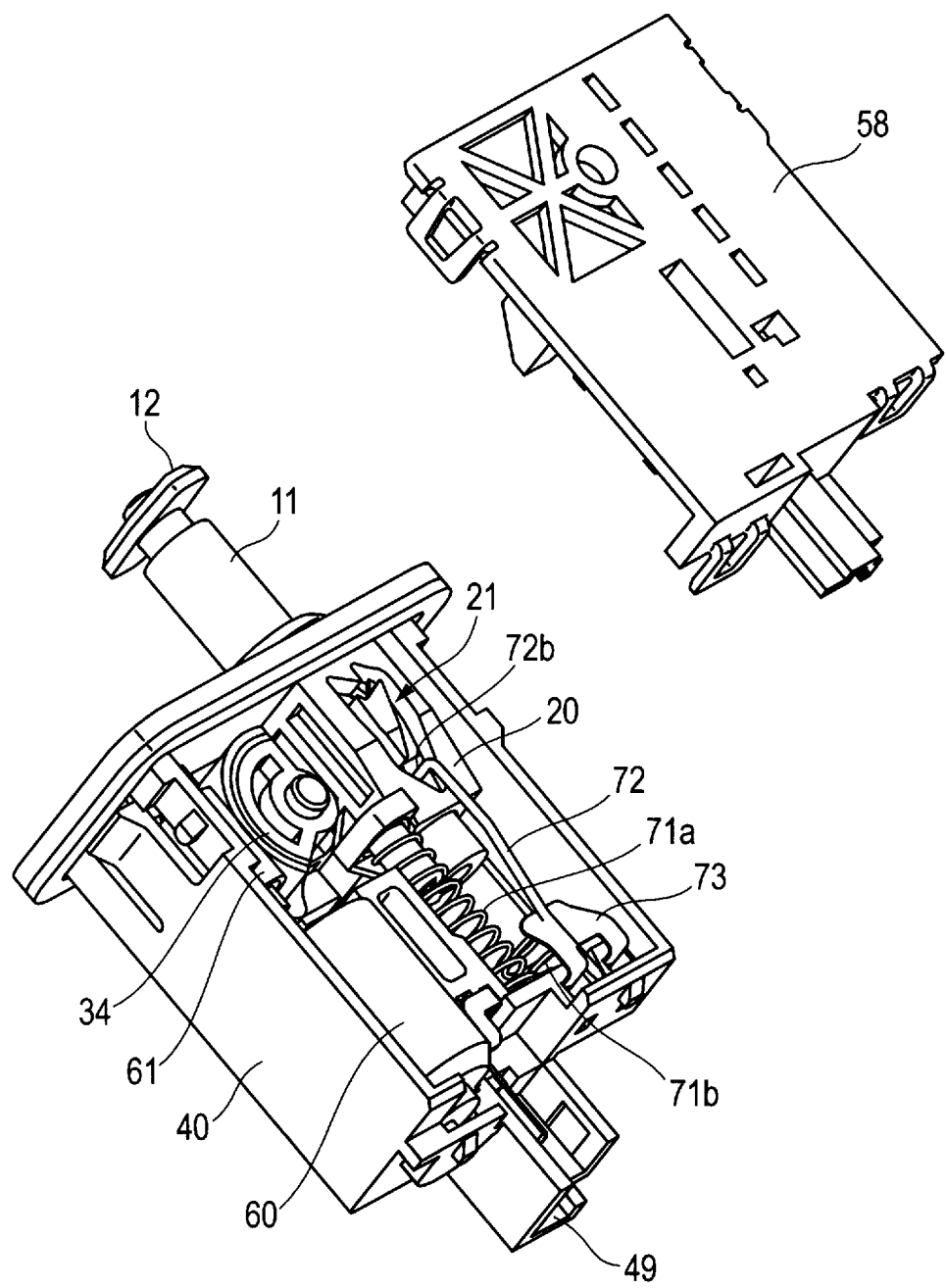
FIG. 12 is a perspective view of the reciprocating device divided into the main unit and a cover according to an embodiment of the present invention.
Figure 13:
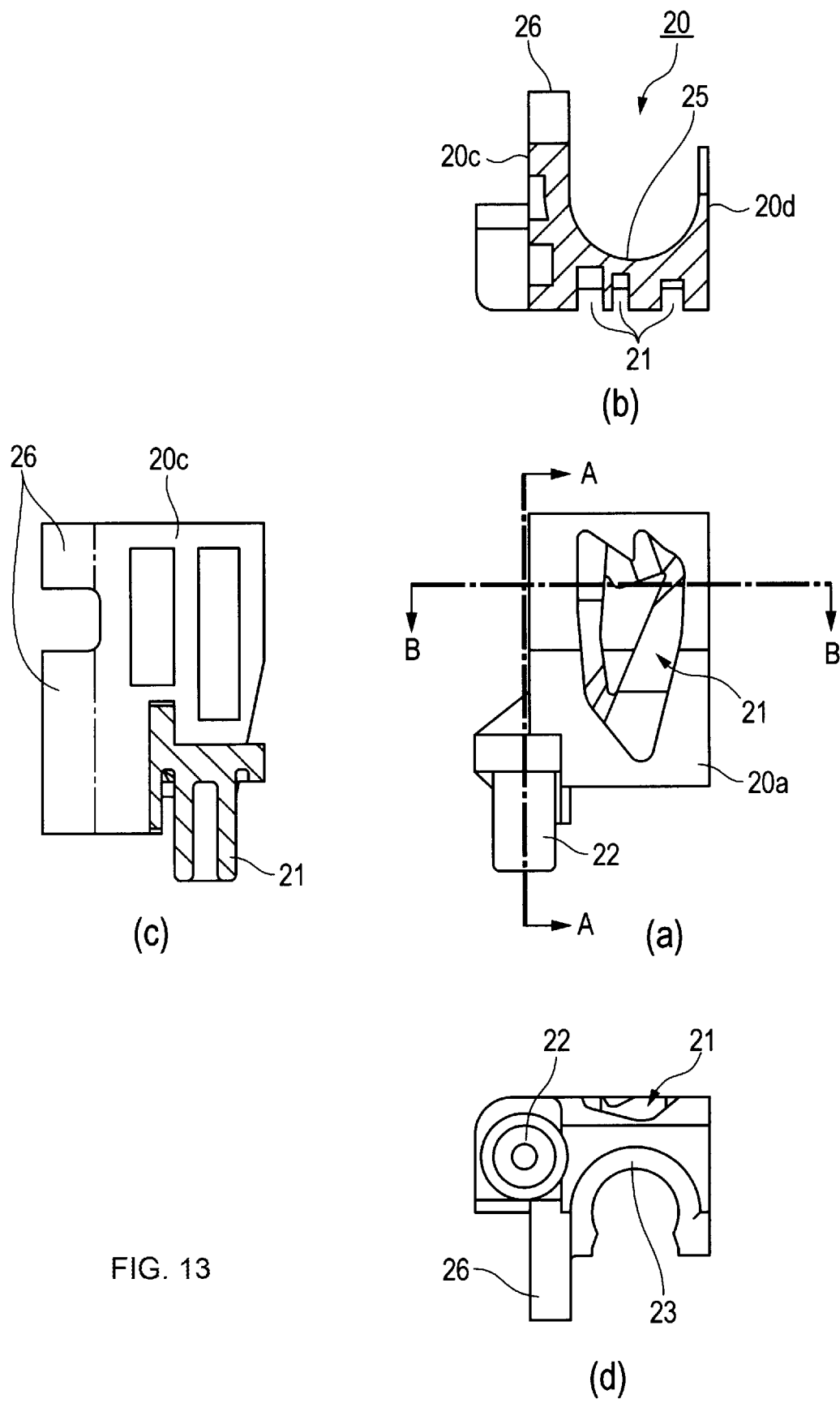
FIG. 13(a) is an elevation view of the reciprocating component-side member in FIG. 7.
FIG. 13(b) is a cross-sectional view taken from line B-B of FIG. 13(a).
FIG. 13(c) is a bottom view of the reciprocating component-side member.
FIG. 13(d) is a cross-sectional view taken from line A-A of FIG. 13(a).

With reference to FIG. 12, the cover 58 is put on the opening of the casing 40 and encloses unilateral sides of a plurality of components contained in the casing 40, and hold the components so as to perform predetermined movements.

According to the reciprocating device 1 configured as described above, while the reciprocating component 11 is located at the forward position as shown in FIG. 4, the latching segment 12 is oriented in a direction in which the lock of the latching-object segment 104 of the fuel lid 101 is disengaged. The worm wheel 34 is fixed at a predetermined rotational position under control of the motor 60 and the restricting member 30 is disposed at the restriction-lift position. At the same time, the reciprocating component 11 receives repulsive force from the first spring 71a via the reciprocating component-side member 20 and is energized to forward direction. The bend 72b of the pin 72 is located at the backward-side place on the circuit of the guide 21 to prevent the reciprocating component 11 from further moving forward.

An external force for backward propulsion applied to the reciprocating component 11, while the reciprocating device 1 is in the state described above, moves the reciprocating component 11 backward. While the reciprocating component 11 is moving backward, the helical groove 14 of the reciprocating component 11 is guided by the protrusion 42 of the casing 40 and moves to the backward position such that the reciprocating component 11 follows a movement route that causes the front end of the reciprocating component 11 to rotate. This configuration causes the reciprocating component 11 to rotate in the direction of rotation centered at the axis.

The reciprocating component 11 moves to the most backward position by the external force such that the first spring 71a gets compressed while the second spring 71b comes into contact with the reciprocating component 11 and increases repulsive force against the reciprocating component 11. As shown in FIG. 5, the bend 72b of the pin 72 is located at the forward-side place on the circuit of the guide 21 and temporarily holds on to prevent the reciprocating component 11 from moving forward. The latching segment 12 of the reciprocating component 11 is oriented in a direction in which the latching segment 12 engages with the latching-object segment 104 of the fuel lid 101.

While the reciprocating component 11 is at the backward position, the worm wheel 34 rotates by control of the motor 60 and thus the restricting member 30 moves to the restriction position as shown in FIG. 5 to restrict a sliding movement of the reciprocating component-side member 20. This configuration restricts the forward-backward movement of the reciprocating component 11.

While the reciprocating component 11 is at the backward position, the worm wheel 34 rotates reversely by control of the motor 60 and thus the restricting member 30 moves to the restriction-lift position as shown in FIG. 4 to lift the restriction on the sliding movement of the reciprocating component-side member 20. This configuration consequently lifts the restriction on the forward-backward movement of the reciprocating component 11.

An external force for backward movement applied to the reciprocating component 11, while the reciprocating device 1 is in the state described above, causes the bend 72b of the pin 72 to move to a path that guides from the forward-side place to the backward-side place on the circuit of the guide 21. Removal of the external force applied to the reciprocating component 11 causes repulsive force of the first spring 71a to slide the reciprocating component-side member 20 and thereby move the reciprocating component 11 to the forward position.

In the reciprocating device 1 according to this embodiment described above, the reciprocating component-side member 20 is rotatably fitted relative to the reciprocating component 11 such that the component is rotatable relative to the member. Thus, while the reciprocating component 11 is rotating and moving forward or backward, the reciprocating component-side member 20 is sliding in the forward or backward direction without rotation. The restricting member 30 is configured to engage with the reciprocating component-side member 20 so as to restrict the forward-backward movement of the reciprocating component 11. This configuration allows the restricting member 30 to reliably engage with the reciprocating component-side member 20 even if the dimensional accuracy of any of these parts is not very high, or any of these parts is worn due to age deterioration.

The restricting member 30 and the worm wheel 34 are provided with a mechanism for converting a rotational movement into a rectilinear movement. Thus, the restricting member 30 moves rectilinearly and engages with the reciprocating component-side member 20. This configuration allows the restricting member 30 to engage with the reciprocating component-side member 20 with increased reliability.

The reciprocating component-side member 20 includes the guide 21 that controls the forward-backward movement of the reciprocating component 11. Thus, even a configuration that lets a reciprocating component 11 simultaneously rotate and move forward or backward can be readily provided with a structure that controls a forward-backward movement of the reciprocating component 11.

The embodiment has been described.

The scope of the present invention should not be limited to the embodiment described above, and may include various modifications and variations. In the embodiment described above, the restricting member moves rectilinearly. However, another configuration may use a restricting member that moves circularly and engages with a reciprocating component-side member, for example.

The embodiment described above exemplifies a fuel lid opening and closing apparatus as an opening and closing apparatus. A reciprocating device according to the present invention can be similarly applied to various flap opening and closing apparatuses, and may be installed on various apparatuses other than opening and closing apparatuses.

INDUSTRIAL APPLICABILITY

The present invention can be applied to a reciprocating device that a reciprocating component moves forward and backward relative to a casing.

REFERENCE SIGNS LIST 1 reciprocating device
11 reciprocating component
12 latching segment
13 annular groove
14 helical groove
20 reciprocating component-side member
21 guide
22 shaft
23 fitting section
24 hollow
25 curved surface
26 projection
30 restricting member
31 prominence
32 indentation
34 worm wheel
36 protrusion
40 casing
41 first holder
42 protrusion
43 through-hole
71 spring
71a first spring
71b second spring
72 pin
72b bend
73 leaf spring
100 opening and closing apparatus
101 fuel lid
104 latching-object segment

The invention claimed is:

1. A reciprocating device comprising:
a casing;
a reciprocating component that can move forward and backward relative to the casing;
a forward-backward position control mechanism that controls the reciprocating component in moving forward to an forward position from the casing and moving backward to a backward position into the casing; and
a restricting member that puts the reciprocating component in a restricted state in which a forward-backward movement of the reciprocating component is restricted,
wherein the reciprocating component is provided on the casing such that the reciprocating component moves forward or backward while rotating relative to the casing,
wherein the forward-backward position control mechanism comprises a casing-side member provided on a predetermined position of the casing and a reciprocating component-side member provided on the reciprocating component, the reciprocating component-side member fit rotatably relative to the reciprocating component,
wherein the restricting member is provided movably between a restriction position where the reciprocating component is put in the restricted state and a restriction-lift position where the restricted state is cleared, and in the restriction position, the reciprocating component is put in the restricted state by engaging with the reciprocating component-side member,
wherein the forward-backward position control mechanism comprises a plate-shaped guide and a guided section guided by the guide, the plate shaped guide regulates relative movement of the reciprocating component-side member to the casing-side member; the guided section is guided to any of a first place and a second place of the guide such that the reciprocating component moves to any of the forward position and the backward position, and
wherein one of the casing-side member and the reciprocating component-side member includes the guided section, and the other member includes the guide.

2. The reciprocating device according to claim 1, wherein one of the casing and the reciprocating component includes a route guide configured to guide the reciprocating component along a route such that the reciprocating component moves forward or backward while rotating relative to the casing, and the other of the casing and the reciprocating component includes a route-receiving guide guided by the route guide.

* * * * *

UNITED STATES PATENT AND TRADEMARK OFFICE
CERTIFICATE OF CORRECTION

Page 1 of 1

PATENT NO. : 10,683,685 B2
APPLICATION NO. : 15/548226
DATED : June 16, 2020
INVENTOR(S) : Hiroshi Sonobe It is certified that error appears in the above-identified patent and that said Letters Patent is hereby corrected as shown below:

On the Title Page

Please insert:
-- (30) Foreign Application Priority Data
Feb. 2, 2015 (JP) ..................... 2015-018352 --.

Signed and Sealed this
Fourth Day of August, 2020

Andrei Iancu
*Director of the United States Patent and Trademark Office*